(12) United States Patent
Van Poucke

(10) Patent No.: US 8,191,467 B2
(45) Date of Patent: Jun. 5, 2012

(54) PUFFING APPARATUS FOR PRODUCING CEREAL CRACKERS AND METHODS THEREOF

(76) Inventor: Steven Van Poucke, Grahamsville, NY (US)

(*) Notice: Subject to any disclaimer, the term of this patent is extended or adjusted under 35 U.S.C. 154(b) by 658 days.

(21) Appl. No.: 12/368,461

(22) Filed: Feb. 10, 2009

(65) Prior Publication Data

US 2009/0205507 A1    Aug. 20, 2009

Related U.S. Application Data

(62) Division of application No. 10/504,444, filed on Feb. 28, 2005, now Pat. No. 7,770,513.

(51) Int. Cl.
*A23L 1/18* (2006.01)
*A47J 37/00* (2006.01)
(52) U.S. Cl. ............... 99/349; 99/353; 99/372; 99/439
(58) Field of Classification Search ............... 99/349, 99/353, 372, 439; 100/232, 208
See application file for complete search history.

(56) References Cited

U.S. PATENT DOCUMENTS

| 4,281,593 | A | | 8/1981 | Gevaert | |
|---|---|---|---|---|---|
| 4,328,741 | A | | 5/1982 | Yoshikazu | |
| 4,936,206 | A | * | 6/1990 | Miles et al. | 100/3 |
| 5,203,261 | A | * | 4/1993 | Davis | 100/42 |
| 5,467,693 | A | | 11/1995 | Van den Berghe | |
| 5,562,021 | A | | 10/1996 | Slanik | |
| 5,755,152 | A | | 5/1998 | Menzin | |
| 6,085,486 | A | * | 7/2000 | Hunter et al. | 53/176 |

* cited by examiner

*Primary Examiner* — Reginald L Alexander
(74) *Attorney, Agent, or Firm* — Sanford J. Asman

(57) ABSTRACT

An apparatus for making puffed food products from starch-containing raw materials. The apparatus has a baking and molding chamber defined by several heatable mold elements. The mold elements are individually actuated by direct hydraulic drive systems. The hydraulic power for these drive systems is selectively derived from a common oil pressure supply system which provides continuously high oil pressure to the direct hydraulic drive system for each mold element. The apparatus also has an improved feed system enabling the supply of raw material into the mold cavity such that no material gets spilled and each mold receives an accurate predetermined quantity of raw material.

13 Claims, 12 Drawing Sheets

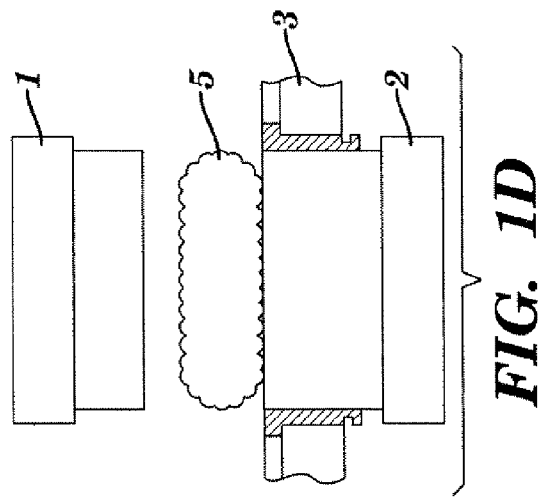
FIG. 1B
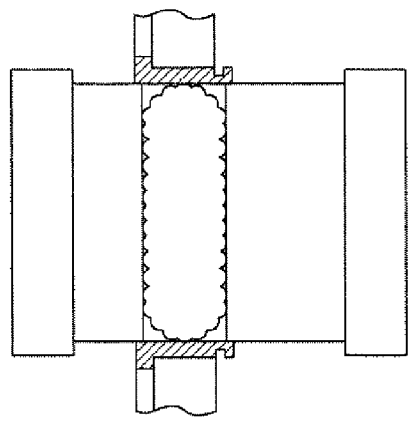
FIG. 1D
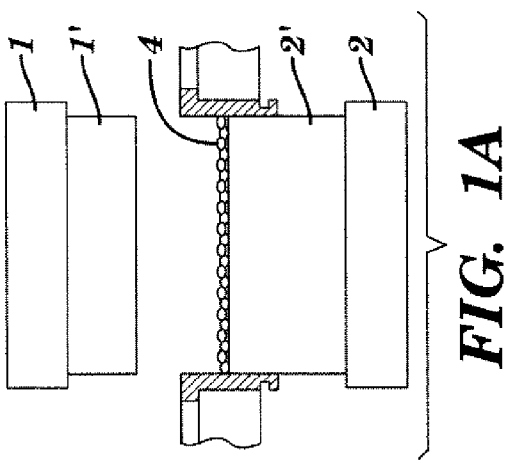
FIG. 1A
FIG. 1C

PUFFING APPARATUS FOR PRODUCING CEREAL CRACKERS AND METHODS THEREOF

This application is a divisional of U.S. application Ser. No. 10/504,444, filed Aug. 12, 2004, which is a national stage application under 35 U.S.C. §371 from PCT Application No. PCT/EP02/01674, filed Feb. 15, 2002.

FIELD

The present invention is related generally to the manufacture of puffed food-starch containing products which are obtainable from rice, corn, wheat and other cereal grains but also from other starch source materials like potato, beans etc. including mixtures of different food starches in any suitable form including grains, broke, grit, flour, pellets and the like.

More particularly, this invention relates to an apparatus enabling automatic production of low-fat puffed-food products from any edible starch source in the form of crackers, cakes, wafers or chips of any desired shape, thickness, crispiness and taste, and this with remarkably increased reliability and efficiency over existing methods and machines.

BACKGROUND

Automatic machines for the making of rice crackers and similar puffed or popped granular cakes by pressure-baking and expanding a food-starch containing material in a heated mold are known from the prior art to exist in a number of distinct machine variants.

Patent documents U.S. Pat. No. 4,328,741 and WO-A-88/00797, for instance, are representative for machine types using air cylinders for selectively moving upwardly or downwardly an upper baking mold relative to a movable lower baking mold and to a stationary ring mold, in which said upper mold and lower molds are coaxially receivable in a fluid-tight manner and thereby forming a sealed molding cavity. These machines produce a lot of noise and are rather energy consuming; furthermore, air cylinders are bulky devices which often are less reliable in terms of baking pressure and cracker thickness requirements.

U.S. Pat. No. 5,562,021 discloses a device for preparing puffed food products from cereals such as rice, wherein the cereal is subjected to heat and pressure in a mold cavity, defined by an exterior wall forming an interior surface about the cavity and by a mold piston or punch being reciprocally driven into and out of the cavity. To avoid the problem of seizing of the pistons while inside the mold cavity, the said patent proposes a recess of a certain depth and height formed in the interior surface of the cavity wall, and to locate therein a cylindrical insert which can move or float within the recess. The mold piston is mounted to a pressure plate, whereby an equalizing spring is provided between the top of the piston flange and the pressure plate. A hydraulic cylinder is adapted to apply pressure to the pressure plate.

U.S. Pat. No. 4,281,593 to Gevaert and U.S. Pat. Nos. 5,102,677 and 5,467,693 to Van den Berghe describe pressure-baking apparatuses comprising a hydraulic jack connected with a toggle mechanism for driving a lower mold or punch upwardly and downwardly relative to a fixed upper mold. The patents to Van den Berghe furthermore propose the use of an annular mold element defining a peripheral wall of a molding chamber which element is selectively movable relative to the fixed upper mold and also to the lower punch. This facilitates the feeding of food-starch material into a mold cavity and the removal of a puffed cracker from the pressure-baking molding expansion chamber formed by said coaxially cooperating upper, lower and peripheral mold elements.

A drawback of said machine types is the use of a toggle mechanism transmitting hydraulic power to the mold in an indirect way and requiring special care for aligning mold parts and controlling molding pressure. In addition a movable peripheral mold is more prone to overstraining and risk of mold leakage, giving rise to defective cracker quality and appearance after a period of time. In addition, the provision of a hydraulic jack together with its oil circuit, oil tank and powering motor on each production machine or unit is rather expensive.

A generally experienced inconvenience in the production of puffed-food snacks by pressure-baking and subsequently expanding a starch-containing cereal or the like mixture in a mold cavity when using currently available technology is the quantity of trash and waste crackers produced by puffing machines, which may amount to 10% or even more of total cracker output. Further disadvantages of known machines for making puffed crackers include the rather long running-in/starting-up times needed until a stable production regime is reached and the need of frequently cleaning the baking mold elements. As a result the productivity and economics of a cracker plant, in particular when making small crackers and chips, may be seriously affected.

SUMMARY

The present invention aims at providing an adequate solution for the production problems and technical shortcomings of prior art technology for puffed cracker production and in particular at removing the above-mentioned technical and economical deficiencies of conventional puffed-food machinery and plants.

According to the invention in its broadest aspect these objects are achieved by providing one of a plurality of pressure-baking apparatuses, wherein each apparatus has "direct" hydraulic drive means for its baking-puffing molds or mold elements and wherein the hydraulic power for said drive means is selectively derivable from a common oil pressure supply line or common rail capable of supplying a constantly and continuously high oil pressure to a direct hydraulic drive cylinder of each mold element, irrespective of the number of apparatuses or instant power needs. More in particular, a puffing apparatus is provided comprising a molding/baking/expansion chamber having upper walls, lower walls and side walls defined respectively in an upper baking mold element, a lower baking mold element and a peripheral mold element, whereby at least said upper and lower mold elements are adapted to be heated and to be selectively moved relative to each other by suitable means, and further a slidable feeding plate adapted both for transporting a predetermined quantity of food-starch raw material into said chamber and for pushing outwardly a shaped puffed cracker from said lower baking mold, the improvement wherein said means for selectively moving the upper mold resp. the lower mold comprise an upper hydraulic double-acting cylinder disposed on top of to said upper mold resp. a lower hydraulic double-acting cylinder attached to the lower side of said lower mold, each of said hydraulic cylinders having a manifold for oil intake and oil outlet mounted directly on the cylinder so as to form an integral part thereof, wherein each manifold is adapted for connection with a pressure oil feed line and with a return oil line and comprises four valves, preferably poppet valves, which operatively cooperate for selectively controlling a forward stroke or a return stroke of the cylinder piston independently in each hydraulic cylinder. From each puffing apparatus the oil is returned through a central return line, for this purpose teed off at each apparatus and then connected to the oil outlet of each cylinder manifold, which flows the used oil back to the collection tank of an oil power unit of proper oil capacity and power output.

In use of the apparatus the four (poppet) valves in the manifold function as follows: a first valve lets the oil in from a central pressure line in a first oil chamber of the cylinder while a second valve lets the oil out from a second oil chamber (at opposite side of the cylinder piston) to a central oil return line, whereby the cylinder piston is moved e.g. in the forward direction over a predetermined distance. The two other valves, not actuated in the forward stroke, work together in a similar way to perform a reverse stroke of the piston.

The pressure oil system of the apparatus is preferably a central system powering simultaneously a plurality of puffing apparatuses. The system is outlined for making available a "constant" high pressure in the pressure oil feed line which is branched of to each cylinder manifold of each apparatus, and this in spite of different oil flows and/or capacity needs according to number of puffing machines and actual process cycle for a given machine.

The power unit of the system comprises an electric motor driving an axial pump with variable swash plate allowing to create a constant hydraulic oil pressure at varying oil flows or capacities. To ensure a constant pressure with highest accuracy the system is preferably provided with three axial pumps and one accumulator.

Another advantage of the central oil power and pump system is that the oil remains at low and constant temperature. Another pump will function as an oil circulation pump circulating the oil through a cooling and filtration unit. In the return line the oil flowing back from each cylinder manifold is further cooled and may be filtered before flowing into the oil tank of the system.

The new direct hydraulic drive means for the mold elements in an apparatus according to the invention surprisingly provides considerable improvements in puffed cracker properties and manufacturing efficiency: a consistently high and constant product quality was achieved, the flexibility to adapt cracker properties w.r.t. composition, texture and shape without risk of burns, seams or desintegration was greatly increased. Moreover machine reliability, incl. trouble-free production runs was remarkably improved. As a result the amount of waste product was tremendously decreased down to below 1.5% on the average.

The inventor is unaware of a cereal puffing machine ever being developed using such a direct hydraulic coupling of the movable mould elements. As a matter of fact, prior art attempts in this direction were discouraged because of insufficiently rapid response times of hydraulic cylinder pistons in a situation requiring explosion-type expansion of the compressed food starch material and highest-speed retraction of a mold element.

Without willing to be bound by theory it is believed that the exceptional and unexpected puffing process improvements obtainable by the novel apparatus according to the invention are due to the following technical features:

1) When a command is given to the valves an immediate reaction occurs in the cylinders because the valves are directly mounted on the cylinders in a manifold thereof and at very close distance to the piston chambers; in addition the preferably used valves are poppet valves which react very quickly, i.e. are actuated instantaneously with a command.

2) The hydraulic cylinders are enabled to operate under extremely fast speed because the driving oil pressure is continuously built-up in the pressure line right at the top of the cylinder. This constant high pressure is released instantly at the moment the poppet valve is actuated. This together results in an attainable mold/cracker expansion time of down to ten milliseconds, which is extremely short.

3) Both top and bottom cylinders of upper and lower molds are independently controlled.

According to another aspect of the invention a puffing apparatus is provided having an improved feed system enabling the supply of raw material into the mold cavity such that no material gets spilled and each individual mold will receive an accurate predetermined quantity of starch-containing raw material selected from grains, pellets, broke, flour etc. incl. mixtures thereof.

According to a further aspect of the invention a puffing apparatus is provided having an improved ring mold design allowing pressure-baking and expansion of particularly a plurality of (small) crackers such as mini-snacks, and this without the risk of premature wear or deformation of the ring mold due to heat differential related misalignment between the ring mold cavities and the upper or lower mold punch elements slidable received in said cavities.

These objects and further embodiments of the invention in many different forms are defined in the appended claims.

BRIEF DESCRIPTION OF THE DRAWINGS

FIGS. 1A-1D are schematic illustrations of the main steps occurring in the process of making a puffed cracker using a stationary ring mold and respective upper and lower movable mold elements or punches;

DETAILED DESCRIPTION

Figure 2A:
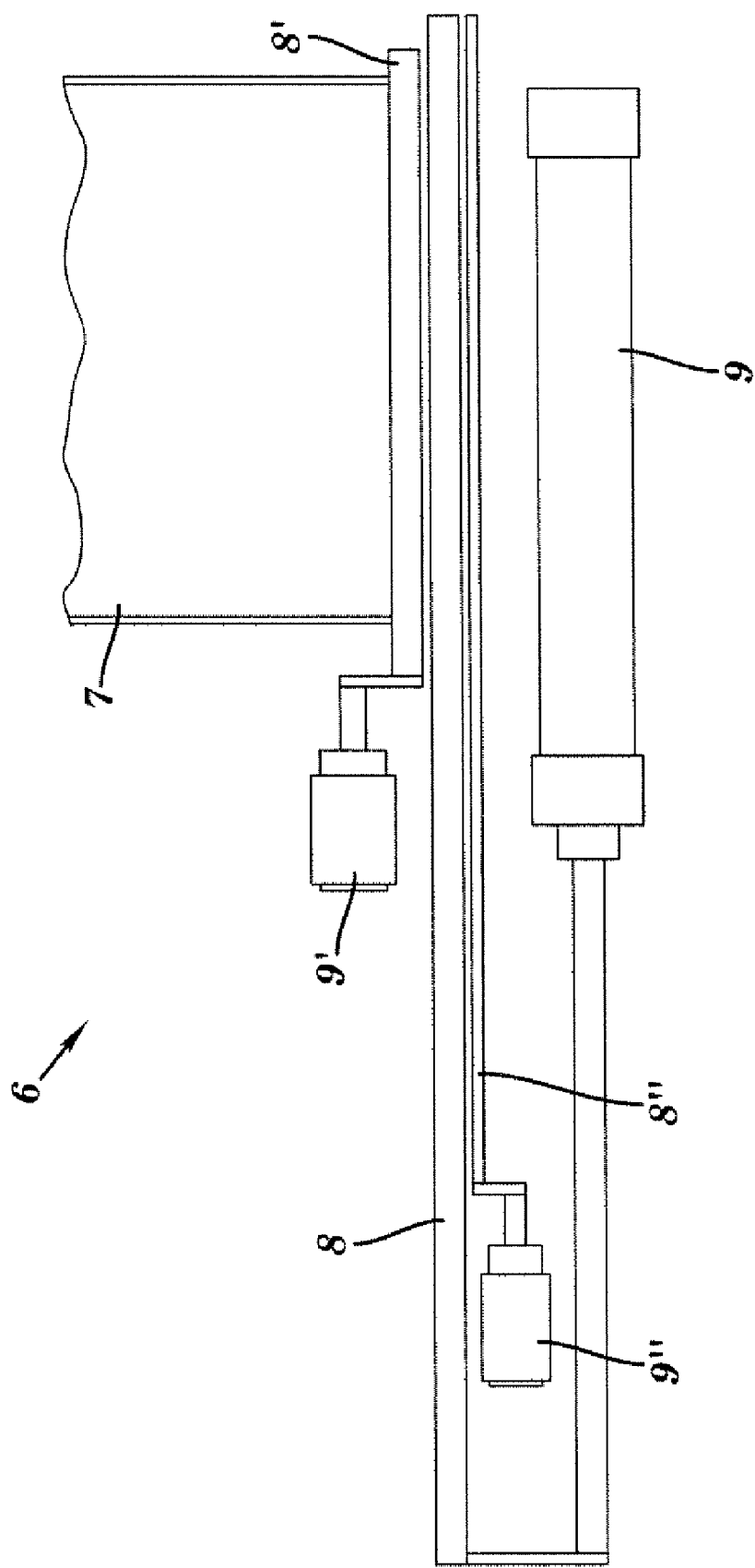
FIGS. 2A-B give side views of a puffing machine arrangement used in the present invention for carrying out the process steps according to FIGS. 1A-1D.

Referring to FIGS. 1A-1D, important mold position steps in the process of producing a puffed cereal wafer or cracker are shown. The mold comprises an upper mold 1 and a lower mold 2, both heatable by means of embedded heating elements (not represented) and movable upwardly and downwardly by being directly driven by hydraulic cylinders as illustrated and explained below. Upper and lower molds generally have punch elements (1',2') which are slidably receivable in a ring mold 3 (preferably fixed but not always required) so as to form therewith a hermetically sealed molding cavity. In FIG. 1A the mold cavity is open and provides a feeding cup for dropping food-starch containing raw material 4 therein by lower mold 2 having been partially retracted within ring mold 3 while upper mold 1 is lifted.

In FIG. 1B shows pressure-baking of raw material 4 being crushed, compressed and heated in a closed cavity by descending the upper mold into the ring mold and then pressurising either one or both of upper and lower molds. The starch in the raw material is gelatinised, becomes amorphous and moisture including chemically bound water of the raw material is driven off and builds up a high internal vapour pressure which is suddenly released as shown in FIG. 1C by quickly retracting upper and/or lower punches relative to one another within the ring mold. As a result the compressed raw material explosively expands thereby forming a puffed or popped wafer 5 filling the expansion chamber space defined between the upper mold, the lower mold and the ring mold. As shown in FIG. 1D the upper mold is in a lifted position again, whereas lower punch is moved in the upward direction to raise the cracker to a discharge position flush with the upper surface of the ring mold. A sliding plate of the raw material feed system will push then the puffed cracker from the raised lower mold surface into a discharge chute where after the baking-puffing cycle can start anew.

Figure 2B:
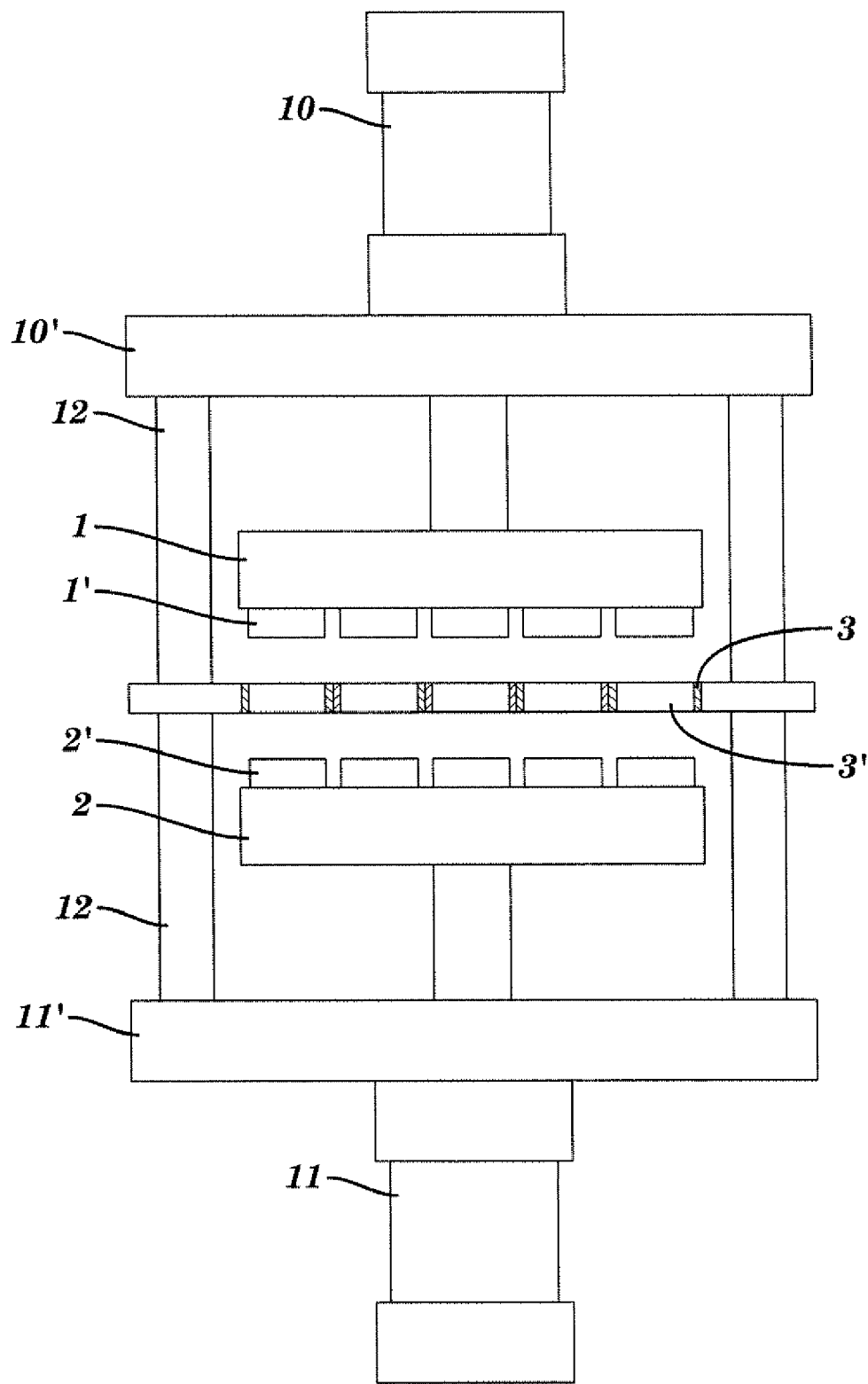

In FIGS. 2A-2B, overall side views of a puffing apparatus are shown comprising a multi-cracker mold, i.e. the upper and lower molds (1,2) include a plurality of die punches (1',2') which are slidably receivable in a plurality of corresponding die holes (not shown) of a stationary ring mold 3. Lateral to the apparatus there is mounted a raw material supply system 6 comprising a raw material supply line 7 (conduit or hopper) and sliding plates (8,8') having suitable perforations and back plates to supply a desired amount of grain or pellet material to each die cavity of the ring mold. Power means (9,9',9"), e.g. air cylinders drive the plates in sliding movements relative to one another and to the ring mold. More in particular, a dosage mechanism (8') driven by cylinder (9') brings an exact amount of raw material from supply line (7') into a transport plate (8). Said transport plate is driven by cylinder (9) and positions the raw material precisely over each lower punch element (2') being then in a cup forming feed position, i.e. received partly within ring mold openings (3'). Release plate (8") driven by cylinder (9") is then actuated to drop or release raw material from transport plate (8) into said ring mold cups or cavities.

On the back side of each movable mold, i.e. on top of upper mold 1 and at the bottom of lower mold 2, there is mounted an upper hydraulic cylinder 10 and a lower drive cylinder 11, both independently actionable in the upward and downward direction to raise or descend said mold elements over a precisely controlled distance and/or to transmit molding pressure to the raw material in the mold cavity according to the desired process stages.

Mounting plates (10', 11') attached to apparatus frame (12) form support and fixation members for top and bottom hydraulic cylinders (10, 11) and also bear and guide the connection thereof with the movable mold elements (1,2). The hydraulic cylinders are powered by a hydraulic oil circuit illustrated schematically in FIG. 3.

Figure 3:
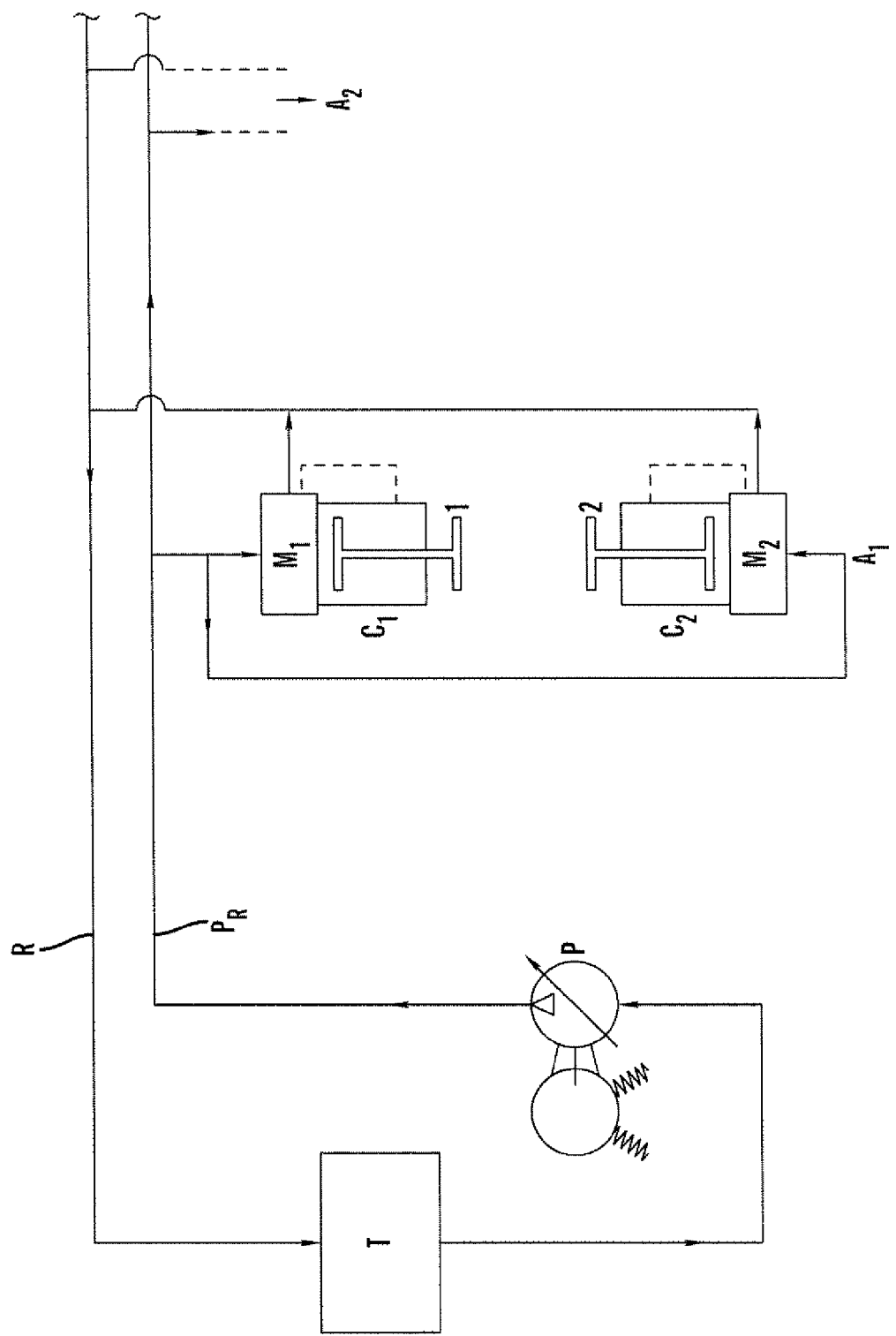
FIG. 3 is a schematic representation of the oil pressure circuit as connected with the hydraulic drive cylinders in a puffing apparatus according to the invention.

As can be seen from FIG. 3, the oil circuit comprises a high-pressure oil line Pr, powered by a pump unit P, and a return line R flowing return oil back to of tank T. The pump unit P is designed to afford continuous availability of high-pressure oil at a precise constant pressure in feed line Pr for a sufficiently broad range of desired oil feed rates. At least one puffing apparatus, generally a plurality of puffing machines A1, A2 etc., is connected to the pressure line Pr and the return line R. In each apparatus high-pressure oil is supplied from line Pr to upper cylinder C1 and lower cylinder C2 for driving respective mold elements schematized by the numerals 1 and 2. Return or displacement oil originating from a piston chamber of the double-action cylinders (C1, C2) is flowed back to return line R. The oil flow requirements for each cylinder are physically and functionally integrated in a manifold M1 of upper cylinder C1, respectively a manifold M2 of lower cylinder C2, which manifolds unite the necessary oil supply/flow connections including valves needed for the piston chambers of each cylinder and which is disposed on top of the cylinder body as a constitutive part thereof.

Figure 4A:
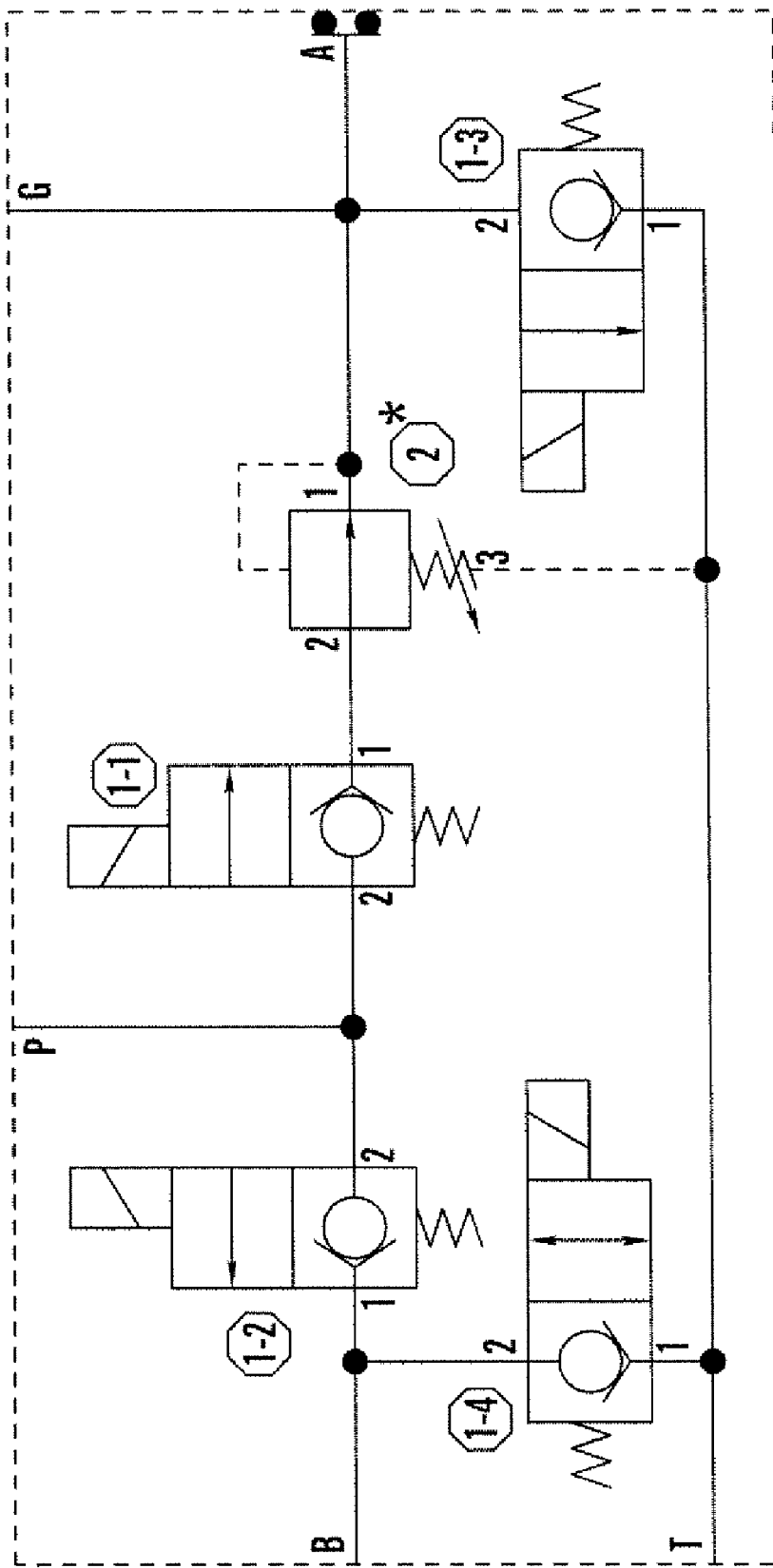
FIGS. 4A-4C give more detailed views of important components in the oil circuit to power a puffing machine drive system according to the invention.
Figure 4B:
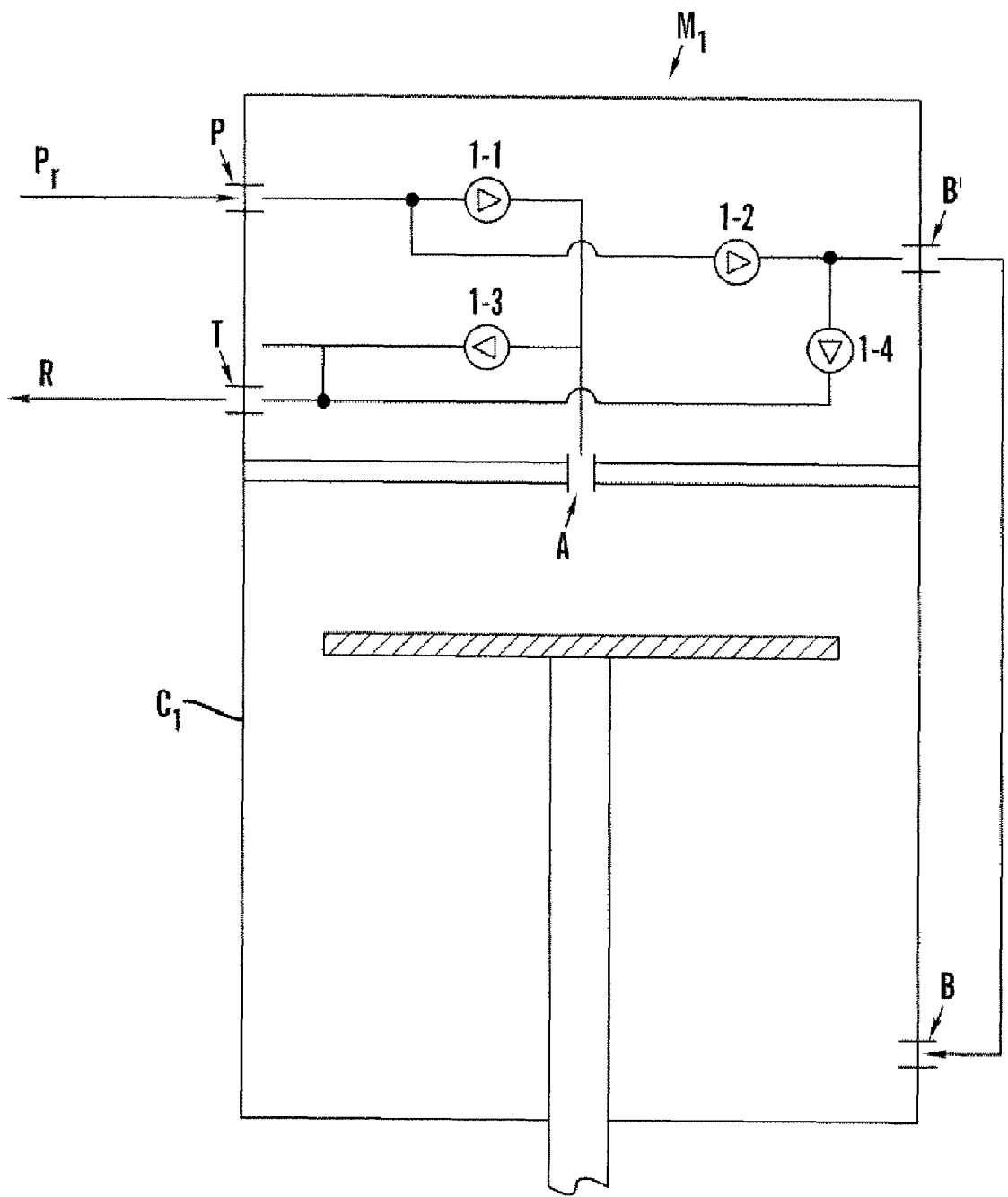
Figure 4C:
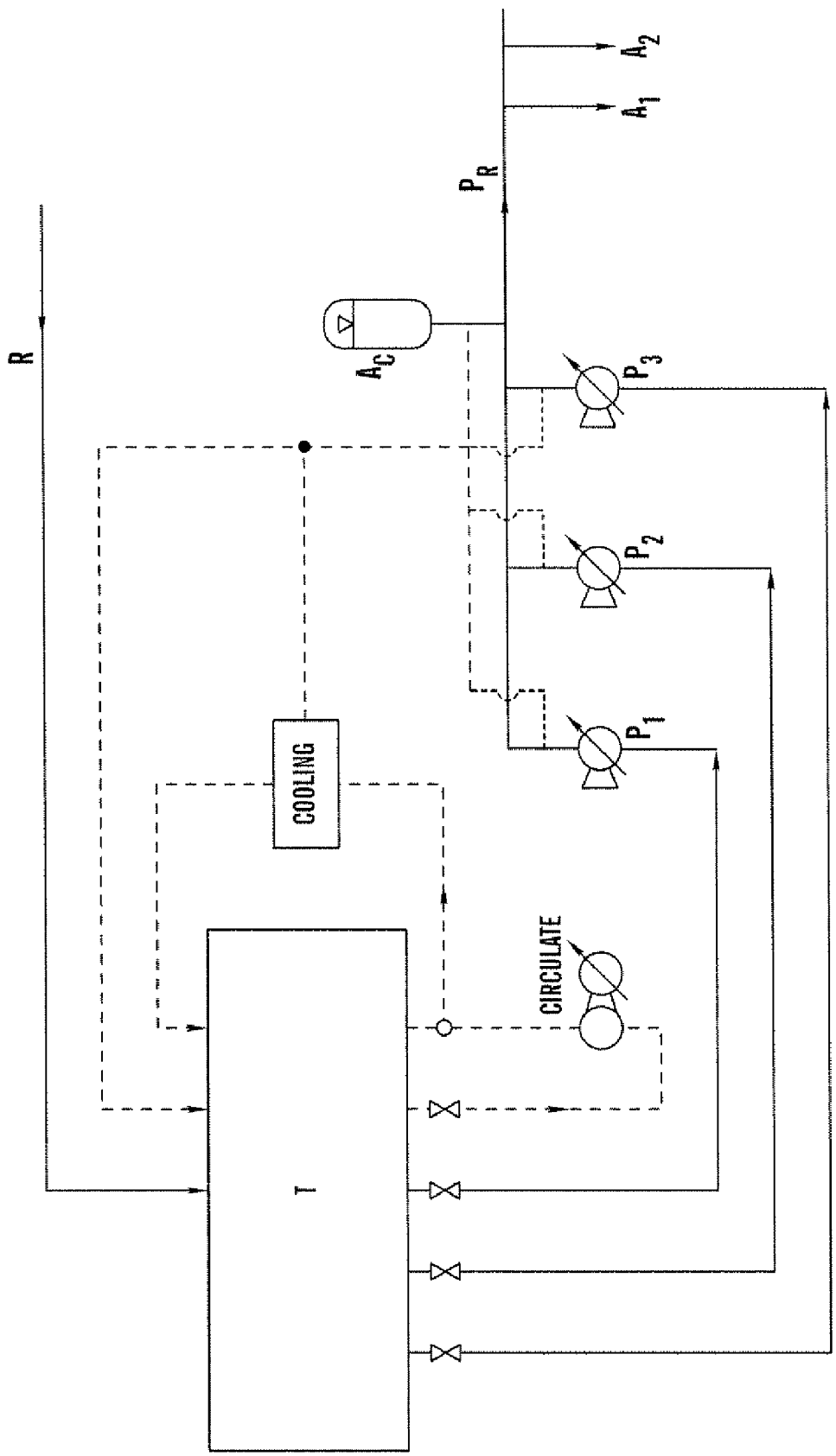

The functioning of the manifold is depicted in FIGS. 4A-4C for the hydraulic cylinder connected to the upper mold element. The piston stroke in the downward direction is performed by actuating simultaneously poppet valves 1-1 and 1-4. Oil from pressure line Pr enters manifold at port P and flows to cylinder port A in upper piston chamber via valve 1-1. At the same time valve 1-4 is opened to enable back-flow of displaced oil from lower piston chamber through port B to the return tank line R. During this stroke the valves 1-2 and 1-3 remain closed. When effecting a reverse stroke in the upward direction the valves 1-2 and 1-3 are activated such that pressure oil flows from port P via valve 1-2 to port B of the lower piston chamber, whereas at the same time oil displaced in the upper piston chamber can flow from port A via valve 1-3 to the tank return line R. At this stage valves 1-1 and 1-4 are then closed.

The manifold oil flow line from intake port P to cylinder port A further preferably contains a (over-) pressure valve 2\* located between valve 1-1 and port A. This allows to regulate the desired molding or crushing pressure for each apparatus individually according to the type and amount of raw material (grains, broke, pellets etc.) fed into the mold cavity, respectively according to the kind of puffed food cracker desired. In addition a part G may be provided which serves as a connection for mounting a (safety) manometer.

Figure 5A:
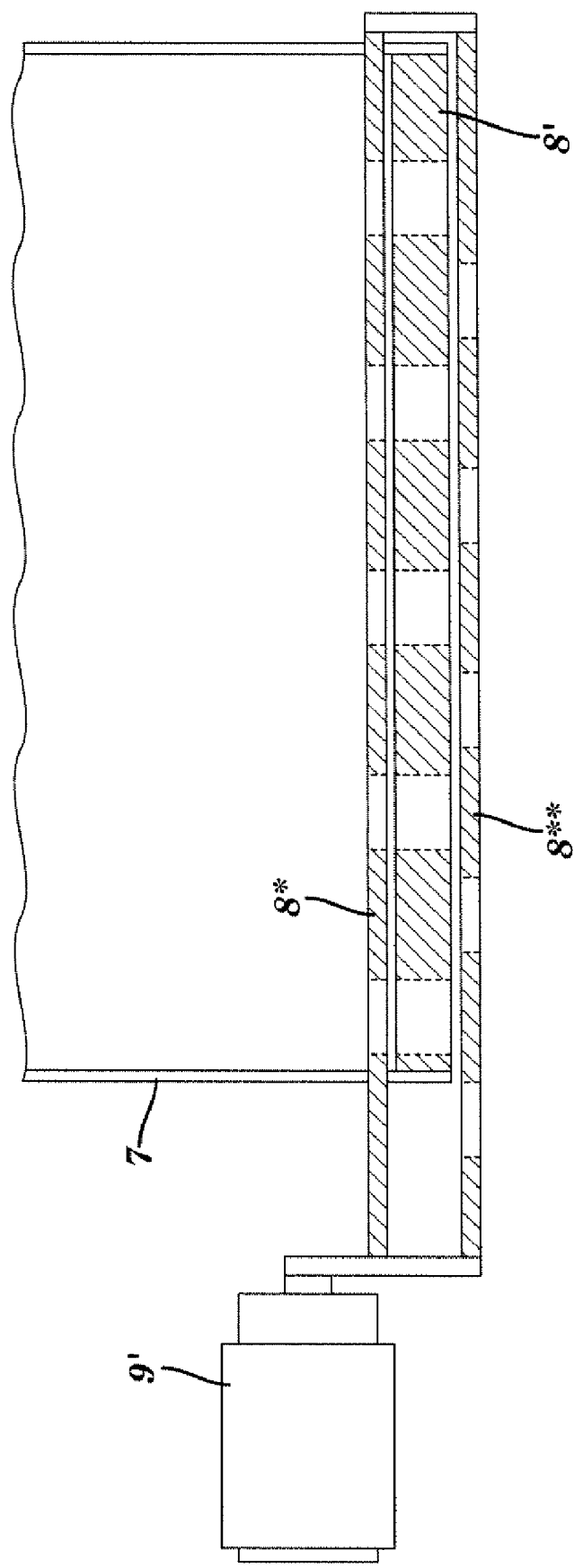
FIGS. 5A-5C are cut-away, side views of a raw material feed system for the puffing apparatus shown in FIGS. 2A-2B.
Figure 5B:
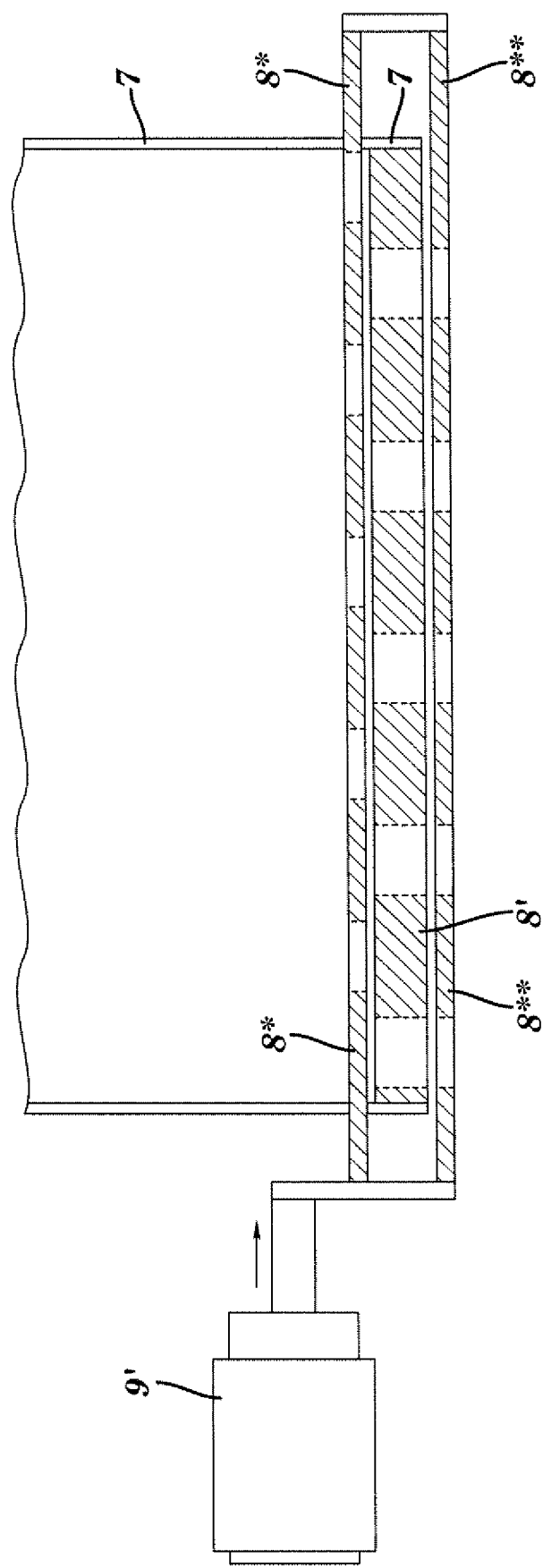
Figure 5C:
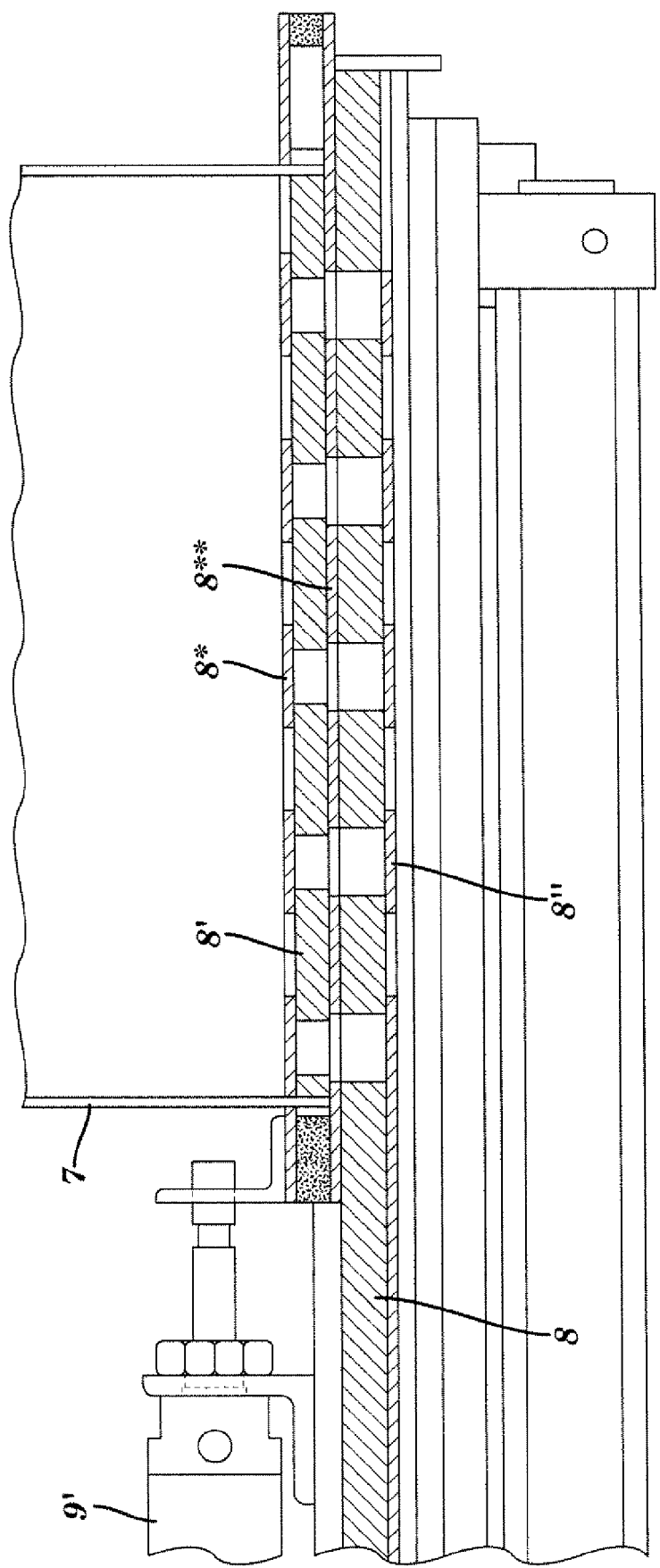

FIGS. 5A-5C show a particular improvement to the material dosing part of the raw material supply system (6) already explained above in connection with FIG. 2. In detail, FIG. 5A shows a first position of the near dosing mechanism which is open to the feed fine (7) and is comprised of a holding or dosing plate (8') of suitable thickness having therein cup forming dosage apertures; said holding plate constitutes the bottom of raw material feed conduit (7) and its top and bottom surfaces are delimited by upper and lower perforated plates (**8\*,8\*\*) which are arranged to slide together parallel to dosimeter plate (8') when actuated by cylinder means (9'). The position of perforated plates (8\*,8\*\*) as depicted in FIG. 5A enables the dosage apertures or cups to be filled with starch-containing raw material. In FIG. 5B the perforated plates are shifted to the right thereby closing the dosimeter cups to the raw material entry side but at the same time opening the cup bottom towards a transport plate (8), in fact a second apertured holding plate cooperating with a perforated back plate (8"), whereby the raw material content of the dosimeter cups in plate (8') is then released—within a closed environment—with maximum accuracy in (preferably wider) openings/cups provided in transport plate (8), having a hole configuration similar to that of the dosimeter plate and of the ring mold cavity pattern. By actuating drive means (9) and (9"), cf FIG. 2, the raw material is transported to the ring mold position and dropped in the respective mold cavities (3'). Thus the provision of a holding/dosimeter plate (8'), combined with perforated sliding plates (8\*,8\*\*), "in addition" to a conventional dosing or holding/transport plate system (8,9; 8',9'**) allows a constantly more accurate supply of precisely metered quantities of raw material to the mold cavities without any losses or spill over of granular or other material which is normally unavoidable in conventional feeding slides of puffing machines.

Figure 6:
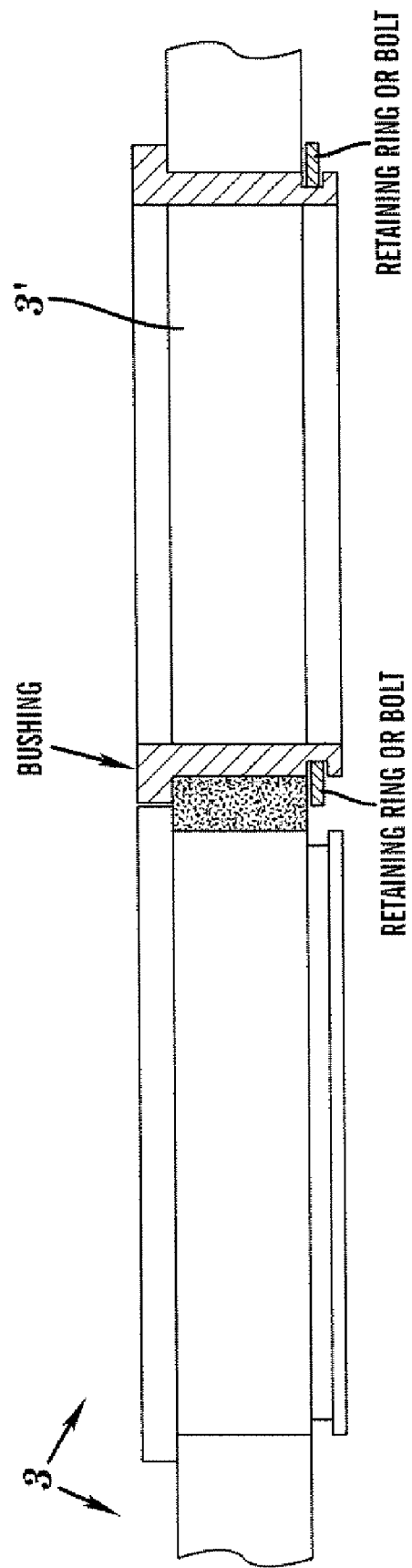
FIG. 6 depicts details of a ring mold embodiment according to the invention.

FIG. 6 shows an improvement in the design of the peripheral mold or ring die wherein the upper and lower punches (1',2') of the movable mold elements must be slidably received in a fluid-tight manner. The ring mold, for instance for a multi-cracker die (e.g. 64 mini-cakes of 25 mm in diameter), comprises a die mounting plate containing a plurality of die holes which is stationary by being fixed to the vertical frame posts (1,2) of the apparatus, about midway between upper and lower supports (10',11') of the hydraulic drives (10,11). Each die hole includes an internal sleeve or a bushing that is elastically mounted to die hole and die plate, such that in use the bushing has a self-aligning or -centering property within the die hole relative to the slidably entering punches. The elastic mounting may be realized by retaining rings or circlips (circular and small die holes) and by screwable fastening elements (bolts and nuts, etc.) for large dies and polygonal shapes. The self-aligning die bushings prevent wear, damage and premature failure of dies or punches, incl. production interruptions due to possible misalignments caused by temperature and thermal expansion differences between die and punch components.

Figure 7:
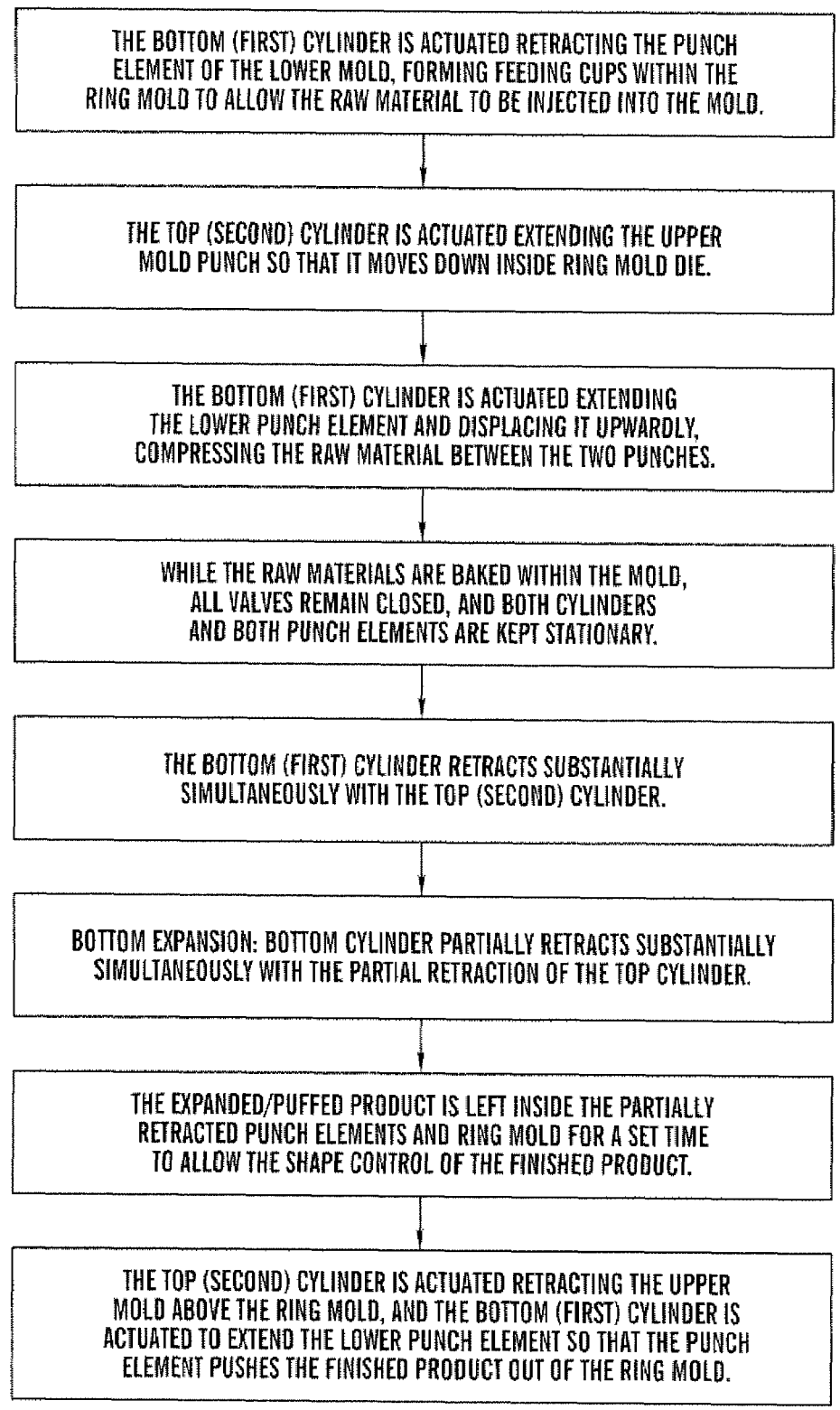
FIG. 7 is flow chart illustrating a process embodiment of the present invention.

The apparatus according to the invention is furthermore very advantageous in terms of process monitoring, controls and adjustments. As a matter of fact the high precision and quick response of the novel hydraulic drive system makes it easier to control the process steps, since all process movements and piston displacements are controllable in terms of time units resp. actuation times of valves in the oil manifold, without need of electromechanical contact, relay or stop means. In practicing the invention, all process movements, cf. FIG. 1, and process temperatures are controlled by a PLC, e.g. a central PLC for a plurality of puffing machines, and are visualized (or selectively visualizable for each connected machine) on a monitor screen or control panel. The process control system comprises the following features and/or steps:

Baking Temperature:
lower mold platen temperature
upper mold platen temperature
Process movements (see also FIG. 7):

1. Cup time: bottom cylinder retracts (goes down) and retracted punches of lower mold form feeding cups within ring mold dies to allow the raw material to be dropped in mold.
2. Start time: top cylinder extends (goes down) and upper mold punch goes down inside ring mold die.
3. Press time: bottom cylinder extends and lower mold punch is displaced upwardly, compressing the raw material between the two punches.
4. Bake time: all valves remain closed, both cylinders and punches are kept stationary.
5. Top expansion: top cylinder retracts.
6. Bottom expansion: bottom cylinder retracts (mostly) simultaneously with top cylinder.
7. Expansion delay: delay time of expanded/puffed product inside the retracted punches or expansion-opened molds to allow shape control of finished product.
8. Thickness control: bottom cylinder extends and recompresses already expanded product to a given extent, thereby controlling shape, thickness and surface flatness (optional).
9. Out time: top cylinder retracts upper mold above ring mold and bottom cylinder extends so that lower mold punch pushes finished product out of ring mold.//Thereafter the cycle starts anew with step 1 including the supply of starch-containing raw material into the mold cavities.

The above process parameters are simply optimised by empirical testing, trial and error and easily adjustable according to raw material kind, cracker type (shape, thickness, ... ) and desired cracker properties such as texture, crispiness etc.

The direct hydraulic drive of the puffing molds in the new combination of super fast actuation of cylinder pistons and continuous availability of a constantly high oil pressure from a common or central high pressure oil line enables the above testing, optimisation and control to be carried out in conditions of increased accuracy, flexibility and reliability and this in much less time than previously possible. This also applies to industrial cracker production in terms of cracker quality and waste generation.

Since a big number of puffing machines are connectable to said central oil line, the new system of puffed cracker manufacture may give rise to substantial savings in power consumption and equipment costs, especially when running a large-scale cracker plant.

Although particular embodiments and working modes of the invention have been illustrated and described, it is clear that numerous modifications, applications and combinations are possible without departing from the key teaching of the invention. In this connection the extent of protection is only limited by the scope of the following claims.

What is claimed is:

1. A system for producing food products from starch-containing raw materials which are subjected to pressure and heat with one or more pressure-molding apparatuses, each of the pressure-molding apparatuses comprising:
   (a) at least one heatable mold cavity comprising a stationary mold element having an interior peripheral wall about the cavity;
   (b) at least one punch movable into and out of the cavity and driven by a double-action hydraulic cylinder operatively connected to the punch; and
   (c) a central oil pressure generator system comprising one or more axial piston pumps of the variable displacement type including a swashplate allowing a stepless variation of oil flow including continuous pressure control and compensation for keeping oil pressure constant irrespective of operatively used oil, central pressure oil generator system further comprising an oil tank for receiving return oil from the hydraulic cylinder by the return line, wherein the hydraulic cylinder comprises a manifold directly mounted onto a head portion of a cylinder body, the manifold has connections with a feed line of pressure oil and a return line of operatively displaced oil, the manifold houses a plurality of oil circuit channels and actuable valves designed for selectively and instantly applying hydraulic oil pressure for a given time duration to an upper or lower piston compartment of the hydraulic cylinder, thereby simultaneously moving a cylinder piston over a desired stroke length in a direction required for pressure-baking the starch-containing raw materials.

2. The apparatus of claim 1 wherein a top wall of the mold cavity is defined by an upper punch driven by an upper hydraulic cylinder and a bottom wall of the mold cavity is defined by a lower punch driven by a lower hydraulic cylinder, the upper and lower punches being separately movable in and out of the cavity.

3. The system of claim 1 wherein the stationary mold element comprises a plurality of mold cavities cooperating with a corresponding plurality of upper punches and lower punches, the upper punches being disposed on an upper punch plat connected to an upper hydraulic cylinder and the lower punches being mounted on a lower punch plate connected to a lower hydraulic cylinder.

4. The system of claim 3 wherein the manifold of each of the upper and lower hydraulic cylinders further comprising an internal oil channel circuit including a main inlet port communicating with the feed line, an outlet port communicating with the return line, an internal oil port for direct pressure oil supply to an upper piston compartment and an external oil port communicating with an inlet/outlet port of a lower piston compartment of the hydraulic cylinder body, which oil circuit has valves which are integrated in the manifold so that their controlled and selective actuation from a control unit, the cylinder piston will instantly perform a stroke of precise length and duration.

5. The system of claim 1 further comprising a plurality of the pressure-molding apparatuses, wherein each one of the pressure-molding apparatuses is connected to the feed line and to the return line.

6. The system of claim 1 wherein the mold element comprises a stationary die plate having at least one aperture with a ring die element disposed therein, the ring die element being mounted in the aperture such that self-aligning of the ring die element is ensured when the punch is driven into and out of the mold cavity.

7. The system of claim 6 wherein the ring die element is fastened in the aperture.

8. The system of claim 6 further comprising a plurality of the apertures in the stationary die plate, each of the apertures with one of the self-aligning ring die elements disposed therein.

9. The system of claim 4 wherein the manifold further comprises a flow control valve for adjusting oil flow to the hydraulic cylinder.

10. The system of claim 1 wherein the central oil pressure generator system further comprises an accumulator device that ensures a constant high oil pressure is stably maintained in the feed line.

11. The system of claim 1 further comprising a feeding system for supplying a metered amount of the starch-containing raw materials into the mold cavity, wherein the feeding system comprises:
   a dosimeter plate with openings defining starch material feed cups; and
   two apertured sliding plates located parallel to and at opposite sides of the dosimeter plate, wherein the two apertured sliding plates are independently actuatable for sliding displacement by being connected to separate actuation system.

12. The system of claim 6 wherein the stationary die plate is detachably disposed on die plate supports.

13. A system for producing food products from starch-containing raw materials which are subjected to pressure and heat with one or more pressure-molding apparatuses, each of the pressure-molding apparatuses comprising:
   (a) at least one heatable mold cavity comprising a stationary mold element having an interior peripheral wall about the cavity, the stationary mold element comprising a plurality of mold cavities cooperating with a corresponding plurality of upper punches and lower punches, the upper punches being disposed on an upper punch plat connected to an upper hydraulic cylinder and the lower punches being mounted on a lower punch plate connected to a lower hydraulic cylinder; and
   (b) at least one punch movable into and out of the cavity and driven by a double-action hydraulic cylinder operatively connected to the punch;
   wherein the hydraulic cylinder comprises a manifold directly mounted onto a head portion of a cylinder body, the manifold has connections with a feed line of pressure oil and a return line of operatively displaced oil, the manifold houses a plurality of oil circuit channels and actuable valves designed for selectively and instantly applying hydraulic oil pressure for a given time duration to an upper or lower piston compartment of the hydraulic cylinder, thereby simultaneously moving a cylinder piston over a desired stroke length in a direction required for pressure-baking the starch-containing raw materials, the manifold of each of the upper and lower hydraulic cylinders further comprising an internal oil channel circuit including a main inlet port communicating with the feed line, an outlet port communicating with the return line, an internal oil port for direct pressure oil supply to an upper piston compartment and an external oil port communicating with an inlet/outlet port of a lower piston compartment of the hydraulic cylinder body, which oil circuit has valves which are integrated in the manifold so that their controlled and selective actuation from a control unit, the cylinder piston will instantly perform a stroke of precise length and duration, the manifold further comprising a flow control valve for adjusting oil flow to the hydraulic cylinder.

* * * * *